(12) United States Patent
Omagari et al.

(10) Patent No.: US 11,173,627 B2
(45) Date of Patent: Nov. 16, 2021

(54) TRANSPORT DEVICE AND SHEET MANUFACTURING APPARATUS

(71) Applicant: SEIKO EPSON CORPORATION, Tokyo (JP)

(72) Inventors: Naoko Omagari, Nagano (JP); Toshiaki Yamagami, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 648 days.

(21) Appl. No.: 16/074,115

(22) PCT Filed: Jan. 19, 2017

(86) PCT No.: PCT/JP2017/001738
§ 371 (c)(1),
(2) Date: Jul. 31, 2018

(87) PCT Pub. No.: WO2017/135050
PCT Pub. Date: Aug. 10, 2017

(65) Prior Publication Data
US 2021/0101311 A1    Apr. 8, 2021

(30) Foreign Application Priority Data
Feb. 2, 2016   (JP) .............................. JP2016-017945

(51) Int. Cl.
*B27N 3/16*   (2006.01)
*B27N 3/02*   (2006.01)
(Continued)

(52) U.S. Cl.
CPC ................ *B27N 3/16* (2013.01); *B27N 3/02* (2013.01); *B65G 53/14* (2013.01); *B65G 53/52* (2013.01); *B65G 2201/04* (2013.01)

(58) Field of Classification Search
CPC ................................ B65G 53/10; B65G 53/14
See application file for complete search history.

(56) References Cited

U.S. PATENT DOCUMENTS 957,126 A * 5/1910 Tilley ..................... B65G 53/14
406/144
1,745,195 A * 1/1930 Thurmond ............. B65G 53/00
406/131
(Continued)

FOREIGN PATENT DOCUMENTS

AT           296151 B      2/1972
EP         2154092 A2      2/2010
(Continued)

OTHER PUBLICATIONS

The Extended European Search Report for the corresponding European Patent Application No. 17747209.9 dated Nov. 27, 2019.

*Primary Examiner* — William R Harp
(74) *Attorney, Agent, or Firm* — Global IP Counselors, LLP

(57) ABSTRACT

A transport device includes a transport pipe for transporting a material to be transported having at least one of a sheet piece, a fiber, and a powder, and a blower for generating an air flow in the transport pipe, the transport device transports the material to be transported by the air flow, in which the transport pipe has an introduction port into which the material to be transported is introduced, the air flow has a velocity difference in a direction orthogonal to a direction of the air flow in the transport pipe, and the introduction port is provided on a side where a velocity of the air flow is lower.

9 Claims, 4 Drawing Sheets

(51) Int. Cl.
 *B65G 53/14* (2006.01)
 *B65G 53/52* (2006.01)

(56) References Cited

U.S. PATENT DOCUMENTS

| | | | |
|---|---|---|---|
| 9,376,272 B2 * | 6/2016 | Sato | ................... B23K 26/00 |
| 2003/0133759 A1 | 7/2003 | Winther | |
| 2015/0166269 A1 | 6/2015 | Roberge et al. | |
| 2015/0191316 A1 | 7/2015 | Sato et al. | |

FOREIGN PATENT DOCUMENTS

| | | |
|---|---|---|
| FR | 2315834 A1 | 1/1977 |
| JP | 54-096990 U1 | 7/1979 |
| JP | 56-149919 A | 11/1981 |
| JP | S57-009313 Y | 2/1982 |
| JP | 08-224491 A | 9/1996 |
| JP | 09-239283 A | 9/1997 |
| JP | 10-086097 A | 4/1998 |
| JP | 2015-129034 A | 7/2015 |
| JP | 2015-168255 A | 9/2015 |
| JP | 2015-182412 A | 10/2015 |
| WO | 2014/187992 A1 | 11/2014 |

\* cited by examiner

US 11,173,627 B2

TRANSPORT DEVICE AND SHEET MANUFACTURING APPARATUS

CROSS-REFERENCE TO RELATED APPLICATIONS

This application is a U.S. National stage application of International Patent Application No. PCT/JP2017/001738, filed on Jan. 19, 2017, which claims priority under 35 U.S.C. § 119(a) to Japanese Patent Application No. 2016-017945, filed in Japan on Feb. 2, 2016. The entire disclosure of Japanese Patent Application No. 2016-017945 is hereby incorporated herein by reference.

TECHNICAL FIELD

The present invention relates to a transport device and a sheet manufacturing apparatus.

BACKGROUND ART

A transport device that pneumatically transports paper made into paper pieces with a shredder or the like is known. For example, Japanese Unexamined Patent Application Publication No. 09-239283 describes a device that sucks a band-shaped sheet, transports the sheet pneumatically, and crushes the sheet with a crusher to transport. In addition, Japanese Unexamined Patent Application Publication No. 10-86097 describes a device in which an ear generated by slitting a web with a slitting device is narrowed by an auxiliary slit device, is sent to a pulverizer through a wind feed pipe, and pulverized finely.

However, in the device described in Japanese Unexamined Patent Application Publication No. 09-239283, a pipe for transporting crushed pieces is connected to the crusher, and the pipe extends in a vertical direction from the crusher. Therefore, in the device described in Japanese Unexamined Patent Application Publication No. 09-239283, in a case where the pipe is thin, there is a possibility that the crushed pieces may stay at an entrance of the pipe. In a case where the pipe is thick, a large flow rate of air flow may be required to obtain a wind velocity necessary for transporting.

In addition, in the device described in Japanese Unexamined Patent Application Publication No. 10-86097, the wind feed pipe extends in a horizontal direction. Therefore, in the device described in Japanese Unexamined Patent Application Publication No. 10-86097, there was a case where the air flow was disturbed at an opening portion of the wind feed pipe into which a narrow ear had entered, and the narrow ear stayed.

SUMMARY

An object of some aspects of the present invention is to provide a transport device capable of suppressing retention of a material to be transported while suppressing the flow rate of the air flow. In addition, another object of some aspects of the present invention is to provide a sheet manufacturing apparatus provided with the transport device.

The present invention has been made to solve at least a portion of the above-described problems, and can be realized as the following aspects or application examples.

According to an aspect of the present invention, there is provided a transport device including a transport pipe for transporting a material to be transported having at least one of a sheet piece, a fiber, and a powder, and a blower for generating an air flow in the transport pipe, the transport device transporting the material to be transported by the air flow, in which the transport pipe has an introduction port into which the material to be transported is introduced, the air flow has a velocity difference in a direction orthogonal to a direction of the air flow in the transport pipe, and the introduction port is provided on a side where a velocity of the air flow is lower.

In such a transport device, a force acts on the side where the velocity of air flow is higher from the side where the velocity of air flow is lower, and it is possible to suppress a backflow of the air flow at the introduction port of the transport pipe. Therefore, in such a transport device, it is possible to prevent the air volume from being short on the downstream side due to the blowback of the air flow, and to suppress the overall flow rate of the air flow by that amount. Furthermore, in such a transport device, it is possible to suppress retention of the material to be transported due to the disturbance of the air flow by the blowback of the air flow.

According to another aspect of the present invention, there is provided a transport device including a transport pipe for transporting a material to be transported having at least one of a sheet piece, a fiber, and a powder, and a blower for generating an air flow in the transport pipe, the transport device transporting the material to be transported by the air flow, in which the transport pipe includes a first portion provided with an introduction port into which the material to be transported is introduced, an inflow direction of the air flow into the first portion is different from an outflow direction of the air flow flowing out from the first portion, and the introduction port is provided on the outflow direction side of the transport pipe when viewed in the inflow direction.

In such a transport device, the air flow can have the velocity difference in the direction orthogonal to the direction of the air flow in the transport pipe, and the introduction port can be provided on the side where the velocity of air flow is lower. As a result, in such a transport device, it is possible to suppress the retention of the material to be transported while suppressing the flow rate of the air flow.

According to still another aspect of the present invention, there is provided a transport device including a transport pipe for transporting a material to be transported having at least one of a sheet piece, a fiber, and a powder, and a blower for generating an air flow in the transport pipe, the transport device transporting the material to be transported by the air flow, in which the transport pipe includes a curved portion, and an introduction port provided inside the curved portion and into which the material to be transported is introduced.

In such a transport device, the air flow can have a velocity difference in a direction orthogonal to the direction of the air flow in the transport pipe, and the introduction port can be provided on the side where the velocity of the air flow is lower. As a result, in such a transport device, it is possible to suppress the retention of the material to be transported while suppressing the flow rate of the air flow.

In the transport device according to the present invention, a radius of curvature of the curved portion may be 5 times or more and 15 times or less an inner width of the curved portion.

In such a transport device, it is possible to more reliably suppress retention of the material to be transported.

The transport device according to the present invention may further include
a guide that guides the material to be transported toward the introduction port.

In such a transport device, it is possible to guide the material to be transported toward the introduction port.

In the transport device according to the present invention,
in the guide, a surface on a downstream side of the air flow may be inclined toward the introduction port in the direction of the air flow in the guide.

In such a transport device, it is possible to suppress the backflow of the air flow at the introduction port.

In the transport device according to the present invention,
the transport pipe may include
a first portion provided with the introduction port, and
a second portion on an upstream side of the air flow from the first portion, and
a cross-sectional area defined by the first portion may be smaller than a cross-sectional area defined by the second portion.

In such a transport device, it is possible to increase the velocity of the air flow in the first portion, and to stably transport the material to be transported in the first portion.

According to still another aspect of the present invention, there is provided a sheet manufacturing apparatus including the transport device according to the present invention.

In such a sheet manufacturing apparatus, the transport device according to the present invention can be provided.

DESCRIPTION OF EMBODIMENTS

Hereinafter, preferred embodiments of the present invention will be described in detail below with reference to the drawings. The embodiments described below do not unduly limit the contents of the present invention described in the aspects. In addition, not all of the configurations described below are necessarily essential components of the present invention.

1. Sheet Manufacturing Apparatus 1.1. Configuration

Figure 1:
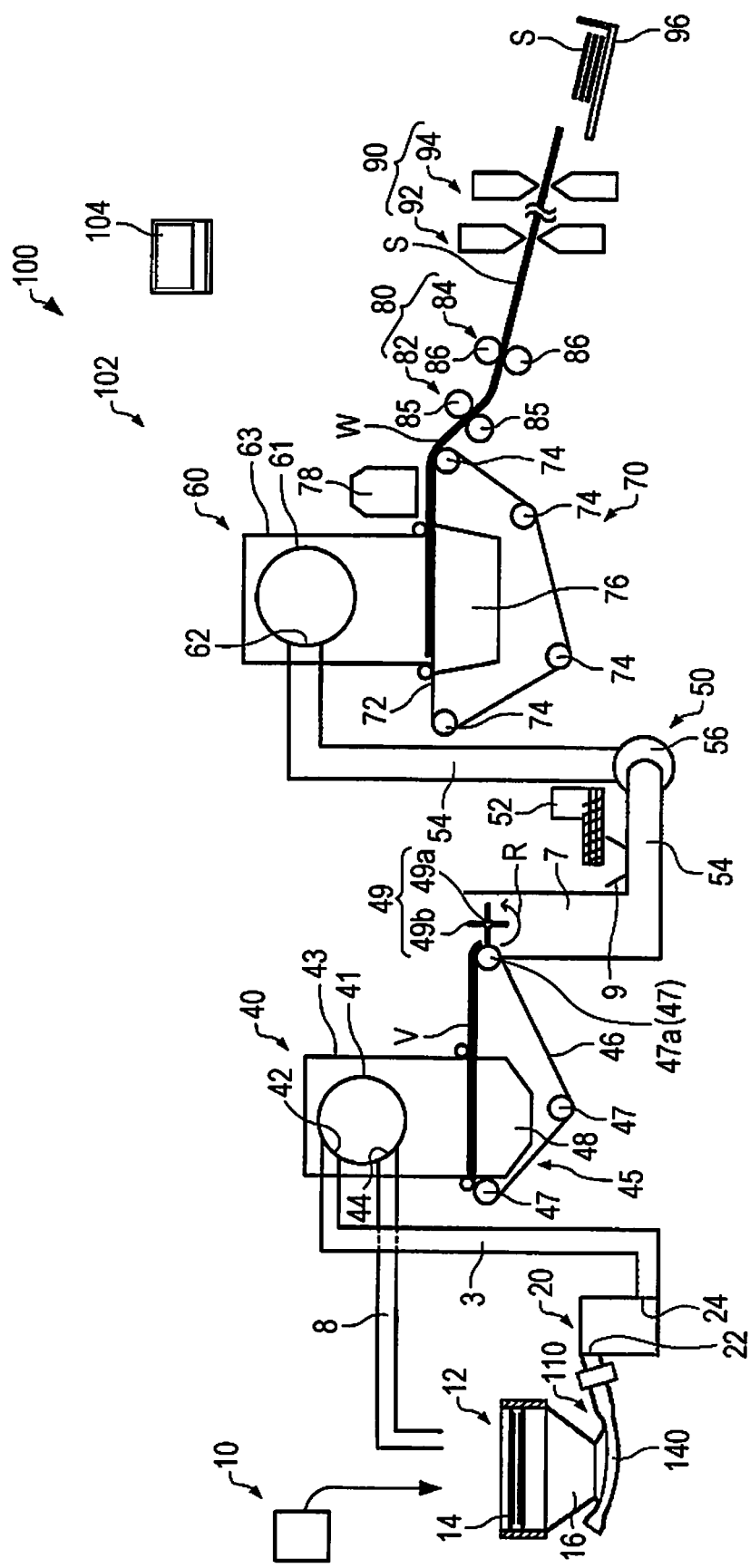
FIG. 1 is a view schematically illustrating a sheet manufacturing apparatus according to an embodiment.

First, a sheet manufacturing apparatus according to the embodiment will be described with reference to the drawings. FIG. 1 is a view schematically illustrating a sheet manufacturing apparatus 100 according to the embodiment.

As illustrated in FIG. 1, the sheet manufacturing apparatus 100 is provided with a supply portion 10, a manufacturing portion 102, and a control portion 104. The manufacturing portion 102 manufactures a sheet. The manufacturing portion 102 includes a coarse crushing portion 12, a defibrating portion 20, a sorting portion 40, a first web forming portion 45, a rotating object 49, a mixing portion 50, an accumulation portion 60, a second web forming portion 70, a sheet forming portion 80, and a cutting portion 90.

The supply portion 10 supplies the raw material to the coarse crushing portion 12. The supply portion 10 is, for example, an automatic input portion for continuously inputting the raw material into the coarse crushing portion 12. The raw material supplied by the supply portion 10 contains fibers such as waste paper and pulp sheet, for example.

The coarse crushing portion 12 cuts the raw material supplied by the supply portion 10 in the air such as atmosphere (in air) to form a strip. The shape and size of the strip is, for example, a strip of several cm square. The coarse crushing portion 12 has, for example, a coarse crushing blade 14 and a shooter (hopper) 16. The coarse crushing portion 12 is able to cut the input raw material by the coarse crushing blade 14. For example, a shredder is used as the coarse crushing portion 12. The raw material cut by the coarse crushing blade 14 is transferred (transported) to the defibrating portion 20 via a transport pipe 140 (transport device 110) after being received by the shooter 16.

The defibrating portion 20 defibrates the raw material cut by the coarse crushing portion 12. Here, "to defibrate" means to unravel the raw material (material to be defibrated) formed by binding a plurality of fibers to each fiber one by one. The defibrating portion 20 also has a function of separating substances such as resin material, ink, toner, bleed inhibitor and the like attached to the raw material from the fiber.

Material which passed through the defibrating portion 20 is referred to as "defibrated material". The "defibrated material" may contain resin (resin for bonding a plurality of fibers) material separated from fibers when unraveling fibers, coloring agents such as ink and toner, or additives such as bleed inhibitor and paper strength enhancer in addition to unraveling defibrated fibers. The shape of unraveled defibrated material is a string or ribbon shape. The unraveled defibrated material may exist in a state not intertwined with other unraveled fiber (independent state), or may exist in a state of being intertwined with other unraveled defibrated material to form a lump.

The defibrating portion 20 performs defibration with a dry method. Herein, performing treatment such as defibration in the air such as atmosphere (in air) rather than in a liquid is referred to as the dry method. As the defibrating portion 20, an impeller mill is used in this embodiment. The defibrating portion 20 has a function of generating the air flow that sucks the raw material and discharges the defibrated material. As a result, the defibrating portion 20 can suck the raw material together with the air flow from an introduction port 22 by the air flow generated by itself, and can perform defibration treatment to transport the defibrated material to a discharge port 24. The defibrated material that has passed through the defibrating portion 20 is transferred to the sorting portion 40 via a pipe 3. As the air flow for transporting the defibrated material from the defibrating portion 20 to the sorting portion 40, the air flow generated by the defibrating portion 20 may be used, or an air flow generation device such as a blower may be provided and the air flow thereof may be used.

In the sorting portion 40, the defibrated material defibrated by the defibrating portion 20 is introduced from an introduction port 42 and sorted according to the length of the fiber. The sorting portion 40 has a drum portion 41 and a housing portion 43 for housing the drum portion 41. As the drum portion 41, for example, a sieve is used. The drum portion 41 has a mesh (filter, screen) and can sort a fiber or a material smaller than a size of mesh sieve (those passing through the mesh, first sorted material), and a fiber, un-defibrated piece, or a lump larger than the size of mesh sieve (those not passing through the mesh, second sorted material). For example, the first sorted material is transferred to the mixing portion 50 via a pipe 7. The second sorted material is returned from a discharge port 44 to the defibrating portion 20 via a pipe 8. Specifically, the drum portion 41 is a sieve of a cylinder rotationally driven by a motor. As the mesh of the drum portion 41, for example, a wire mesh, an expanded metal obtained by stretching a metal plate with a notch, and a punching metal having a hole formed in a metal plate by a pressing machine or the like are used.

The first web forming portion 45 transports the first sorted material that has passed through the sorting portion 40 to the mixing portion 50. The first web forming portion 45 includes a mesh belt 46, a stretching roller 47, and a suction portion (suction mechanism) 48.

The suction portion 48 can suck the first sorted material dispersed in the air through an opening (mesh opening) of the sorting portion 40 onto the mesh belt 46. The first sorted material is accumulated on the moving mesh belt 46 to form a web V. The basic configuration of the mesh belt 46, the stretching roller 47, and the suction portion 48 is the same as that of a mesh belt 72, a stretching roller 74, and a suction mechanism 76 of a second web forming portion 70 described later.

By passing through the sorting portion 40 and the first web forming portion 45, a web V containing a large amount of air and in a soft and swelling state is formed. The web V accumulated on the mesh belt 46 is introduced into the pipe 7 and transported to the mixing portion 50.

The rotating object 49 can cut the web V before the web V is transported to the mixing portion 50. In the illustrated example, the rotating object 49 has a base portion 49a and a projection portion 49b projecting from the base portion 49a. The projection portion 49b has, for example, a plate shape. In the illustrated example, four projection portions 49b are provided, and four projection portions 49b are provided at equal intervals. By rotation of the base portion 49a in a direction R, the projection portion 49b can rotate about the base portion 49a. By cutting the web V with the rotating object 49, it is possible to reduce fluctuation in the amount of defibrated material per unit time supplied to the accumulation portion 60, for example.

The rotating object 49 is provided in the vicinity of the first web forming portion 45. In the illustrated example, the rotating object 49 is provided in the vicinity of a stretching roller 47a (next to stretching roller 47a) located on the downstream side in the passage of the web V. The rotating object 49 is provided at a position where the projection portion 49b can be in contact with the web V and is not in contact with the mesh belt 46 on which the web V is accumulated. As a result, it is possible to prevent the mesh belt 46 from being worn (damaged) by the projection portion 49b. The shortest distance between the projection portion 49b and the mesh belt 46 is, for example, 0.05 mm or more and 0.5 mm or less. This is a distance at which the mesh belt 46 can cut the web V without being damaged.

The mixing portion 50 mixes the first sorted material (first sorted material transported by first web forming portion 45) that has passed through the sorting portion 40 and the additive including a resin. The mixing portion 50 has an additive supply portion 52 for supplying the additive, a pipe 54 for transporting the first sorted material and the additive, and a blower 56. In the illustrated example, the additive is supplied to the pipe 54 from the additive supply portion 52 via a hopper 9. The pipe 54 is continuous with the pipe 7.

In the mixing portion 50, air flow is generated by the blower 56, and the first sorted material and additives can be transported while being mixed in the pipe 54. The mechanism for mixing the first sorted material and the additive is not particularly limited, and may be a mechanism that stirs with a blade rotating at high speed, or a mechanism that uses rotation of a container like a V type mixer.

As the additive supply portion 52, a screw feeder as illustrated in FIG. 1, a disk feeder not illustrated or the like is used. The additive supplied from the additive supply portion 52 contains a resin for binding a plurality of fibers. When the resin is supplied, the plurality of fibers are not bound. When passing through the sheet forming portion 80, the resin melts and binds the plurality of fibers.

The resin supplied from the additive supply portion 52 is a thermoplastic resin or a thermosetting resin, and examples thereof include AS resin, ABS resin, polypropylene, polyethylene, polyvinyl chloride, polystyrene, acrylic resin, polyester resin, polyethylene terephthalate, polyphenylene ether, polybutylene terephthalate, nylon, polyamide, polycarbonate, polyacetal, polyphenylene sulfide, polyether ether ketone, and the like. These resins may be used singly or as a mixture thereof. The additive supplied from the additive supply portion 52 may be in a fibrous form or powder form.

The additives supplied from the additive supply portion 52 may contain a coloring agent for coloring the fibers, an aggregation inhibitor for suppressing aggregation of the fibers or aggregation of the fibers, and a flame retardant for causing fibers less flammable, in addition to the resin binding the fibers, depending on the type of the sheet to be manufactured. The mixture (mixture of first sorted material and additive) that has passed through the mixing portion 50 is transferred to the accumulation portion 60 via the pipe 54.

The accumulation portion 60 introduces the mixture that has passed through the mixing portion 50 from an introduction port 62, unravels the intertwined defibrated material (fibers), and descends while dispersing in the air. Furthermore, in a case where the resin of the additive supplied from the additive supply portion 52 has a fibrous form, the accumulation portion 60 unravels the intertwined resin. As a result, the accumulation portion 60 can accumulate the mixture with good uniformity in the second web forming portion 70.

The accumulation portion 60 has a drum portion 61 and a housing portion 63 for accommodating the drum portion 61. As the drum portion 61, a rotating cylindrical sieve is used. The drum portion 61 has a mesh and causes fibers or material (fibers or material passing through mesh) smaller than the size of mesh sieve and contained in the mixture passed through the mixing portion 50 to descend. The configuration of the drum portion 61 is, for example, the same as that of the drum portion 41.

The "sieve" of the drum portion 61 may not have the function of sorting out a specific object. That is, the "sieve" used as the drum portion 61 means that the sieve has a mesh, and the drum portion 61 may descend all of the mixture introduced to the drum portion 61.

The second web forming portion 70 accumulates a passing material that has passed through the accumulation portion 60 to form a web W. The second web forming portion 70 has, for example, a mesh belt 72, a stretching roller 74, and a suction mechanism 76.

While moving, the mesh belt 72 accumulates the passing material passing through the opening (opening of mesh) of the accumulation portion 60. The mesh belt 72 is stretched by the stretching roller 74, and is configured so as to allow air to pass therethrough with difficulty in passing the passing material. The mesh belt 72 moves as the stretching roller 74 rotates on its own axis. While the mesh belt 72 continuously moves, the passing material passing through the accumulation portion 60 continuously accumulates, so that the web W is formed on the mesh belt 72. The mesh belt 72 is formed of, for example, metal, resin, cloth, or nonwoven fabric.

The suction mechanism 76 is provided below the mesh belt 72 (on a side opposite to accumulation portion 60 side). The suction mechanism 76 can generate an air flow directed downward (air flow directed from the accumulation portion 60 to the mesh belt 72). By the suction mechanism 76, the mixture dispersed in the air by the accumulation portion 60 can be sucked onto the mesh belt 72. As a result, the discharge rate from the accumulation portion 60 can be increased. Furthermore, the suction mechanism 76 can form a down flow in the falling passage of the mixture, and it is possible to prevent from being interwined with the defibrated material and the additive during the falling.

As described above, by passing through the accumulation portion 60 and the second web forming portion 70 (web forming step), a web W containing a large amount of air and in a soft and swelling state is formed. The web W accumulated on the mesh belt 72 is transported to the sheet forming portion 80.

In the illustrated example, a humidity conditioning portion 78 for conditioning the web W is provided. The humidity conditioning portion 78 can adjust the amount ratio between the web W and water by adding water or vapor to the web W.

The sheet forming portion 80 presses and heats the web W accumulated on the mesh belt 72 to form a sheet S. In the sheet forming portion 80, a plurality of fibers in the mixture can be bound to each other via the additive (resin) by applying heat to the mixture of the defibrated material and additive mixed in the web W.

The sheet forming portion 80 is provided with a pressing portion 82 that presses the web W and a heating portion 84 that heats the web W pressed by the pressing portion 82. The pressing portion 82 is configured to include a pair of calender rollers 85, and applies pressure to the web W. As the web W is pressed, the thickness decreases and the density of the web W increases. As the heating portion 84, for example, a heating roller, a hot press molding machine, a hot plate, a hot air blower, an infrared heater, and a flash fixing device are used. In the illustrated example, the heating portion 84 is provided with a pair of heating rollers 86. By configuring the heating portion 84 as the pair of heating rollers 86, the sheet S can be formed while continuously transporting the web W, as compared with a case where the heating portion 84 is configured as a plate-like pressing device (flat plate pressing device). Here, the pair of calender rollers 85 (pressing portion 82) can apply a pressure higher than the pressure applied to the web W by the pair of heating rollers 86 (heating portion 84) to the web W. The number of the pair of calender rollers 85 and the pair of heating rollers 86 is not particularly limited.

The cutting portion 90 cuts the sheet S formed by the sheet forming portion 80. In the illustrated example, the cutting portion 90 has a first cutting portion 92 for cutting the sheet S in a direction intersecting with the transport direction of the sheet S and a second cutting portion 94 for cutting the sheet S in a direction parallel to the transport direction. For example, the second cutting portion 94 cuts the sheet S that has passed through the first cutting portion 92.

As described above, a single sheet S of a predetermined size is formed. The cut single sheet S is discharged to a discharge portion 96.

In the sheet manufacturing apparatus 100, the defibrated material that has passed through the defibrating portion 20 may be transferred to a classifying portion (not illustrated) via the pipe 3. A classified material in the classifying portion may be transported to the sorting portion 40. The classifying portion classifies the defibrated material that has passed through the defibrating portion 20. Specifically, the classifying portion separates and removes relatively small material or material with low density (such as resin material, coloring agent, and additive) among the defibrated materials. As a result, it is possible to increase the proportion occupied by fibers which are relatively large material or material with high density among the defibrated materials. As the classifying portion, for example, cyclone, elbow jet, eddy classifier are used.

1.2. Transport Device

Figure 2:
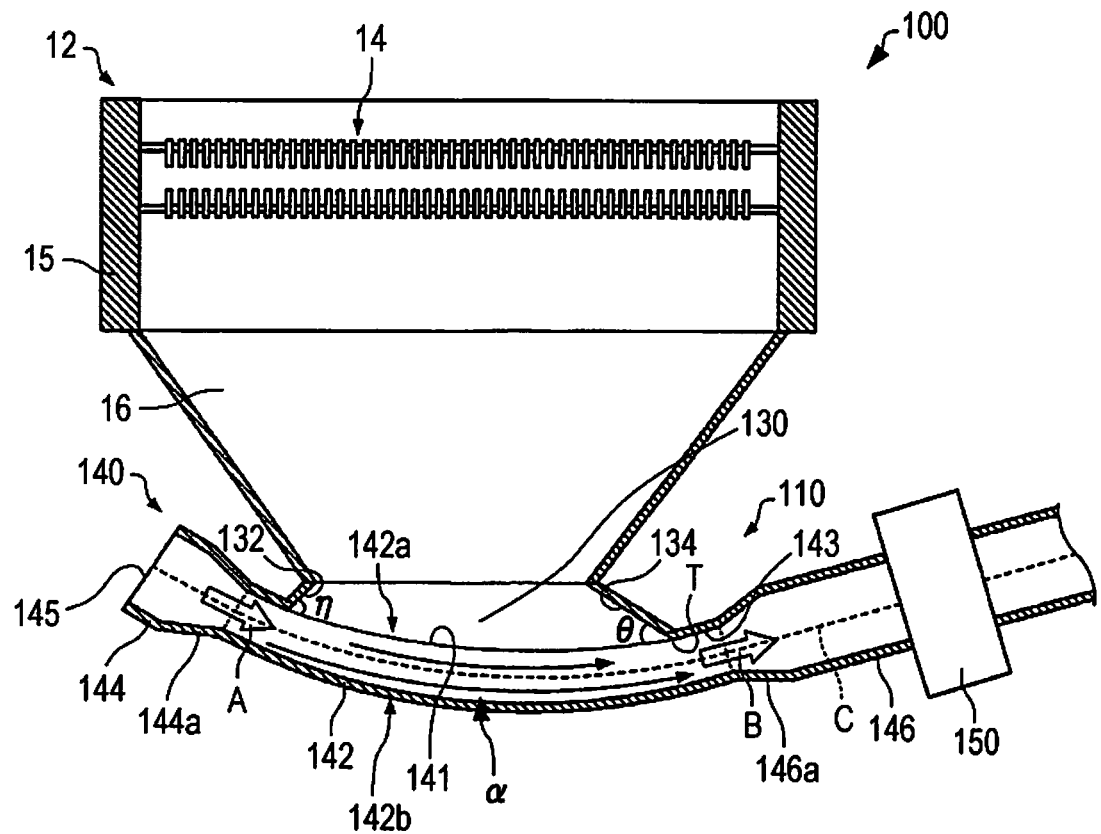
FIG. 2 is a cross-sectional view schematically illustrating a transport device of the sheet manufacturing apparatus according to the embodiment.

As illustrated in FIG. 1, the sheet manufacturing apparatus 100 is provided with a transport device 110. Here, FIG. 2 is a cross-sectional view schematically illustrating the transport device 110. As illustrated in FIG. 2, the transport device 110 has a guide portion 130, a transport pipe 140, and an air flow generation portion 150. A material to be transported passing through the shooter 16 is introduced into the transport device 110.

The shooter 16 guides the material to be transported that is passed through the coarse crushing portion 12 to the guide portion 130. The material to be transported includes at least one of a sheet piece, a fiber, and powder. "Sheet piece" is, for example, a strip cut by the coarse crushing blade 14. "Fiber" is a defibrated material, for example, a defibrated material that is defibrated by the defibrating portion 20 and returned to the coarse crushing portion 12 through the pipe 8. "Powder" is a powdery fiber or resin which is a raw material of the sheet S.

Figure 3:
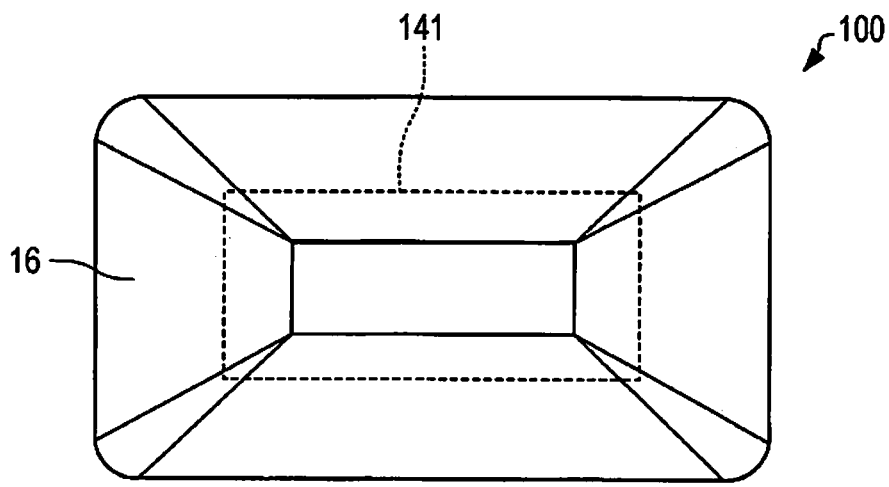
FIG. 3 is a plan view schematically illustrating the transport device of the sheet manufacturing apparatus according to the embodiment.

The shooter 16 is provided, for example, below the coarse crushing blade 14 (below gravity acting direction). In the illustrated example, the shooter 16 has a tapered shape of which the width narrows from the side of the coarse crushing blade 14 toward the side of the guide portion 130. The planar shape of the shooter 16 may be substantially rectangular as illustrated in FIG. 3. The shooter 16 is connected to, for example, a support portion 15 supporting the coarse crushing blade 14.

The guide portion 130 guides the material to be transported that passed through the shooter 16 toward an introduction port 141 of the transport pipe 140. The guide portion 130 is provided below the shooter 16. In the illustrated example, the guide portion 130 has an inverted tapered shape with a wider width from the side of the shooter 16 toward the side of the introduction port 141. The planar shape of the guide portion 130 may be substantially rectangular. The guide portion 130 can facilitate connection between the transport pipe 140 and the shooter 16 (coarse crushing portion 12).

The guide portion 130 may be formed integrally with the shooter 16, may be formed integrally with the transport pipe 140, or may be integrally formed with the shooter 16 and the transport pipe 140.

As illustrated in FIG. 2, the guide portion 130 has a first inclined surface 132 and a second inclined surface 134. The inclined surfaces 132, 134 are inner surfaces of the guide portion 130. The first inclined surface 132 is provided on the upstream side of the air flow α inside the transport pipe 140. The second inclined surface 134 is provided on the downstream side of the air flow α from the first inclined surface 132. The inclined surfaces 132, 134 are inclined with respect to the direction of the air flow α.

The transport pipe 140 transports the material to be transported that is passed through the guide portion 130 to the defibrating portion 20. The material of the transport pipe 140 is not particularly limited, and is, for example, resin or metal. The transport pipe 140 has the introduction port 141 into which the material to be transported is introduced. In the illustrated example, the transport pipe 140 has a first portion 142 provided with the introduction port 141. The introduction port 141 communicates the inside of the guide portion 130 and the inside of the transport pipe 140. In the example illustrated in FIG. 3, the planar shape of the introduction port 141 is a rectangle, and the shape is not particularly limited. It is preferable that the length in the short side direction (for example, diameter in a case of introduction port being a circle) of the introduction port 141 be longer than the maximum length of the material to be transported. As a result, it is possible to suppress clogging of the material to be transported at the introduction port 141. Furthermore, it is preferable that the inner width (for example, inner diameter) of the transport pipe 140 be longer than the maximum length of the material to be transported. As a result, it is possible to suppress clogging of the material to be transported in the transport pipe 140.

The first portion 142 of the transport pipe 140 is a side wall of the transport pipe 140. In the example illustrated in FIG. 2, the first portion 142 is a curved portion having a curved shape. The introduction port 141 is provided on the inner side (side with a larger curvature) of the first portion 142 which is the curved portion. A center line C of the transport pipe 140 has an arc shape in the first portion 142. In the illustrated example, the cross-sectional area (area orthogonal to center line C) defined by the first portion 142 is constant along the center line C.

A radius of curvature of the first portion 142 of the transport pipe 140 is, for example, 5 times or more and 15 times or less the inner width of the first portion 142. Here, the "inner width" is the maximum length in the direction orthogonal to the air flow α in the first portion 142. Specifically, the "inner width" is the inner diameter (diameter) in a case where the cross-sectional shape of the first portion 142 is circular, the "inner width" is the length of the long axis in a case where the cross-sectional shape of the first portion 142 is an ellipse, and the "inner width" is the length of the longest line segment among the line segments connecting the two apexes in a case where the cross-sectional shape of the first portion 142 is a polygon.

The air flow α is generated in the transport pipe 140. The transport device 110 transports the material to be transported by the air flow α. In the transport pipe 140, the air flow α has a velocity (wind velocity) difference in a direction orthogonal to the direction of the air flow α. Since the first portion 142 is curved as described above, a velocity difference occurs in the air flow α due to the centrifugal force. That is, in the air flow α passing through the first portion 142, the velocity inside the first portion 142 (side with a larger curvature) is smaller than the velocity outside the first portion 142 (side with a smaller curvature). The introduction port 141 is provided on the side where the velocity of the air flow α is lower (inside of first portion 142). The difference between the velocity inside the first portion 142 and the velocity outside the first portion 142 is, for example, 1 m/s or more and 10 m/s or less, and preferably approximately 5 m/s.

The first portion 142 of the transport pipe 140 has an inner surface 143. As illustrated in FIG. 2, the inner surface 143 is represented as a curve in cross-sectional view. As illustrated in FIG. 2, the inner surface 143 (curve 143) intersects the second inclined surface 134 at a point T, and an inclination angle θ between the second inclined surface 134 and a tangent (not illustrated) at a contact point T of the inner surface 143 (curve 143) is, for example, 30° or more and less than 90°. The inclination angle θ is preferably 30° or more and 60° or less. The second inclined surface 134 which is the downstream side surface of the air flow α is inclined with respect to the direction of the air flow α. In other words, the inclined surface 134 of the guide portion 130 is inclined toward the introduction port 141 in the direction of the air flow α. In the illustrated example, the first inclined surface 132 is also inclined with respect to the direction of the air flow α. The inclination angle η of the first inclined surface 132 and the tangent (not illustrated) at the contact point with the first inclined surface 132 of the inner surface 143 (curve 143) is, for example, 30° or more and less than 90°.

The transport pipe 140 has, for example, a second portion 144 on the upstream side of the air flow α from the first portion 142 and a third portion 146 on the downstream side of the air flow α from the first portion 142. The cross-sectional area defined by the first portion 142 is smaller than the cross-sectional area defined by the second portion 144 and the cross-sectional area defined by the third portion 146. In the illustrated example, the second portion 144 has a connection portion 144a connected to the first portion 142. The cross-sectional area defined by the connection portion 144a gradually decreases in the direction of the air flow α. The second portion 144 has an opening 145 into which the air flow α is introduced. The third portion 146 has a connection portion 146a connected to the first portion 142. The cross-sectional area defined by the connection portion 146a gradually increases toward the direction of the air flow α. The third portion 146 is connected to, for example, the defibrating portion 20.

An inflow direction A of the air flow α into the first portion 142 of the transport pipe 140 is different from an outflow direction B of the air flow α flowing out from the first portion 142. When viewed from the inflow direction A, the introduction port 141 is provided on the outflow direction B side of the transport pipe 140. That is, the first portion 142 has a first side wall portion 142a on the outflow direction B side and a second side wall portion 142b on the side opposite to the outflow direction B side when viewed from the inflow direction A, and the introduction port 141 is provided in the first side wall portion 142a.

The air flow generation portion 150 generates the air flow α in the transport pipe 140. In the illustrated example, the air flow generation portion 150 is provided in the third portion 146. As the air flow generation portion 150, for example, a blower for sucking air is used. The air flow generation portion 150 may be controlled by the control portion 104 (refer to FIG. 1). Although not illustrated, the air flow generation portion 150 may be provided in the pipe 3 (refer to FIG. 1) or the defibrating portion 20 may function as the air flow generation portion 150.

The transport device 110 has, for example, the following features.

In the transport device 110, the air flow α has a velocity difference in a direction orthogonal to the direction of the air flow α in the transport pipe 140, and the introduction port 141 is provided on the side of the air flow α at a lower velocity. Therefore, in the transport device 110, a force acts on the side where the velocity of the air flow α is higher (outside of first portion 142, side of second side wall portion 142b) from the side where the velocity of the air flow α is lower (inside of first portion 142, side of first side wall portion 142a), and it is possible to suppress the blowback of the air flow α at the introduction port 141 of the transport pipe 140. Therefore, in the transport device 110, it is possible to prevent the air volume from being short on the downstream side due to the blowback of the air flow α, and to suppress the overall flow rate of the air flow α by that amount. As a result, in the transport device 110, it is possible to reduce the size of the air flow generation portion 150.

Furthermore, in the transport device 110, it is possible to suppress retention of the material to be transported due to the disturbance of the air flow α by the blowback of the air flow α. Furthermore, in the transport device 110, for example, it is possible to suppress the retention of the material to be transported due to the lack of the air volume on the downstream side by the blowback of the air flow α. As a result, in the transport device 110, the material to be transported can be stably introduced into the transport pipe 140, and the material to be transported can be stably transported.

As described above, in the transport device 110, it is possible to suppress the retention of the material to be transported while suppressing the flow rate of the air flow.

In the transport device 110, the inflow direction A of the air flow α into the first portion 142 provided with the introduction port 141 is different from the outflow direction B of the air flow α flowing out from the first portion 142, and when viewed from the inflow direction A, the introduction port 141 is provided on the outflow direction B side of the transport pipe 140. Therefore, in the transport device 110, the air flow α can have a velocity difference in a direction orthogonal to the direction of the air flow α in the transport pipe 140, and the introduction port 141 can be provided on the side where the velocity of the air flow α is lower. As a result, in the transport device 110, it is possible to suppress the retention of the material to be transported while suppressing the flow rate of the air flow.

In the transport device 110, the transport pipe 140 has the first portion 142 which is a curved portion, and the introduction port 141 which is provided inside the first portion 142 and into which the material to be transported is introduced. Therefore, in the transport device 110, the air flow α can have a velocity difference in a direction orthogonal to the direction of the air flow α in the transport pipe 140, and the introduction port 141 can be provided on the side where the velocity of the air flow α is lower. As a result, in the transport device 110, it is possible to suppress the retention of the material to be transported while suppressing the flow rate of the air flow.

In the transport device 110, the radius of curvature of the first portion 142 which is a curved portion is 5 times or more and 15 times or less the inner width of the first portion 142. Therefore, in the transport device 110, the retention of the material to be transported can be suppressed more reliably (refer to "2. Experimental examples" below for details).

The transport device 110 further includes a guide portion 130 for guiding the material to be transported toward the introduction port 141. Therefore, in the transport device 110, the material to be transported can be guided toward the introduction port 141.

In the transport device 110, the guide portion 130 has an inverted tapered shape in which the width thereof increases toward the introduction port 141, and the second inclined surface 134 of the guide portion 130 on the downstream side of the air flow α is inclined with respect to the direction of the air flow α. In other words, the second inclined surface 134 is inclined toward the introduction port 141 in the direction of the air flow α. Therefore, in the transport device 110, it is possible to suppress the blowback of the air flow α at the introduction port 141 (refer to "2. Experimental examples" below for details).

In the transport device 110, the cross-sectional area defined by the first portion 142 is smaller than the cross-sectional area defined by the second portion 144. Therefore, in the transport device 110, for example, the velocity of the air flow in the first portion 142 can be increased as compared with the case where the cross-sectional area defined by the first portion 142 is the same as the cross-sectional area defined by the second portion 144. As a result, in the transport device 110, the material to be transported can be stably transported in the first portion 142.

2. Experimental Examples

Experimental examples will be illustrated below, and the present invention will be described in more detail. The present invention is not limited at all by the following experimental examples.

2.1. Transport Device used in Experiment Examples

Experiments were performed using five transport devices (transport device according to Examples 1 to 4 and transport device according to Comparative Example 1).

In the transport device according to Example 1, a transport device such as the transport device 110 described above is used. That is, a first portion 142 is a curved portion, and an inclined surfaces 132, 134 of a guide portion 130 are inclined with respect to the direction of the air flow a (both inclination angles θ, are η are 45 °).

In the transport device according to Example 1, the radius of curvature of the first portion 142 at the center line C was 350 mm, and the inner diameter of the first portion 142 was 30 mm. The size in the longitudinal direction at a boundary between the shooter 16 and the guide portion 130 was 200 mm and the size in the direction perpendicular to the longitudinal direction was 25 mm (that is, opening area of the boundary is 5000 mm$^2$). The air volume of the air flow α was 2.4 m$^3$/min, and the material to be transported was polyethylene terephthalate (PET) fibers (average fiber length 5 mm, average diameter 100 µm).

The transport device according to Example 2 is the same as the transport device according to Example 1 except that the flow rate of the air flow α was 2.2 m³/min, and the material to be transported was a strip of the PET sheet (strip cut by coarse crushing portion 12, average length 10 mm, average width 4 mm, average thickness 0.15 mm).

The transport device according to Example 3 is the same as the transport device according to Example 1 except that the inclined surfaces 132, 134 of the guide portion 130 were orthogonal to each other without being inclined with respect to the direction of the air flow α, the radius of curvature at the center line C of the first portion 142 was 300 mm, the inner diameter of the first portion 142 was 55 mm, the size in the longitudinal direction at the boundary between the shooter 16 and the guide portion 130 was 250 mm and the size in the direction perpendicular to the longitudinal direction was 45 mm (that is, opening area of boundary was 11,250 mm²), the air volume of the air flow α was 1.8 m³/min, and the material to be transported was a strip of plain paper copier (PPC) paper (average length 36 mm, average width 4 mm).

The transport device according to Example 4 is the same as the transport device according to Example 1 except that the second inclined surface 134 of the guide portion 130 was perpendicular without being inclined with respect to the direction of the air flow α, the radius of curvature at the center line C of the first portion 142 was 800 mm, the inner diameter of the first portion 142 was 55 mm, the size in the longitudinal direction at the boundary between the shooter 16 and the guide portion 130 was 350 mm, the size in the direction perpendicular to the longitudinal direction was 40 mm (that is, opening area of boundary was 14,000 mm²), the air volume of the air flow α was 2 m³/min, and the material to be transported was a strip of PPC paper (average length 20 mm, average width 5 mm).

Figure 4:
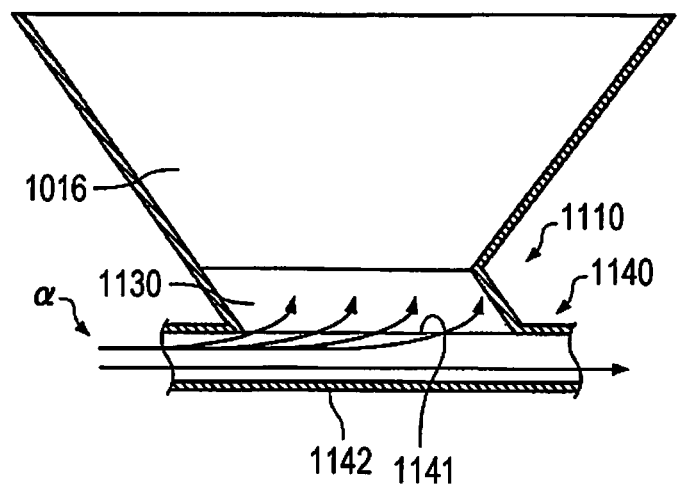
FIG. 4 is a cross-sectional view schematically illustrating a transport device according to a comparative example.

As illustrated in FIG. 4, a transport device 1110 according to Comparative Example 1 includes a shooter 1016, a guide portion 1130, and a transport pipe 1140. A first portion 1142 of the transport pipe 1140 does not have a curved shape and extends linearly. The guide portion 1130 does not have a tapered shape. The inner diameter of the first portion 1142, the size of the opening at the boundary between the shooter 16 and the guide portion 130, the air volume of the air flow α, and the material to be transported are the same as the conditions described in the transport device according to Example 1. For convenience, illustration of the air flow generation device is omitted in FIG. 4.

2.2. Examination on Retention Amount of Material to be Transported

The retention amount of the material to be transported was examined using the transport device according to Examples 1 to 4 and Comparative Example 1 as described above. Specifically, the air flow generation device of the transport device 110 was driven for a predetermined period of time, and the retention state of the material to be transported inside the shooter 16 and the guide portion 130 was observed. It can be said that there is no retention of the materials to be transported as the amount of materials to be transported remaining in the transport pipe is small.

In the order of Example 1, Example 2, Example 3, and Example 4, there was a tendency that the amount of materials to be transported (retention amount) retained in the shooter 16 and the guide portion 130 tended to increase, but it was found that the introduction port 141 was not blocked. On the other hand, in Comparative Example 1, the material to be transported retained in the shooter 1016 and the guide portion 1130, and a state where the introduction port 1141 was blocked occurred. In the transport device 1110 according to Comparative Example 1, as illustrated in FIG. 4, the blowback of the air flow occurred at the introduction port 1141, it is considered that the retention of the material to be transported occurred, and the retention amount increased. Therefore, it was found that by causing the first portion 142 of the transport pipe 140 to be curved, it is possible to suppress the retention of the material to be transported.

The reason that the retention amount in Examples 1 and 2 was less than that in Examples 3 and 4 is considered to be due to the fact that the guide portion 130 has an inverted tapered shape having a wider width toward the introduction port 141 and the second inclined surface 134 is inclined with respect to the transport direction of the air flow α in the transport device according to Examples 1 and 2. Therefore, it was found that at least the second inclined surface 134 among the first inclined surface 132 and the second inclined surface 134 of the guide portion 130 was inclined with respect to the transport direction of the air flow α, so that the retention of the material to be transported could be further suppressed. In this manner, it is preferable that the second inclined surface 134 which is the downstream surface of the guide portion 130 be inclined so as to be inclined in the direction of the air flow α toward the introduction port.

Furthermore, according to Examples 3 and 4, it was found that the retention of the material to be transported could be more reliably suppressed by setting the radius of curvature of the first portion 142 to 5 times or more and 15 times or less, preferably 5 times or more and 14 times or less the inner width of the first portion 142.

Figure 5:
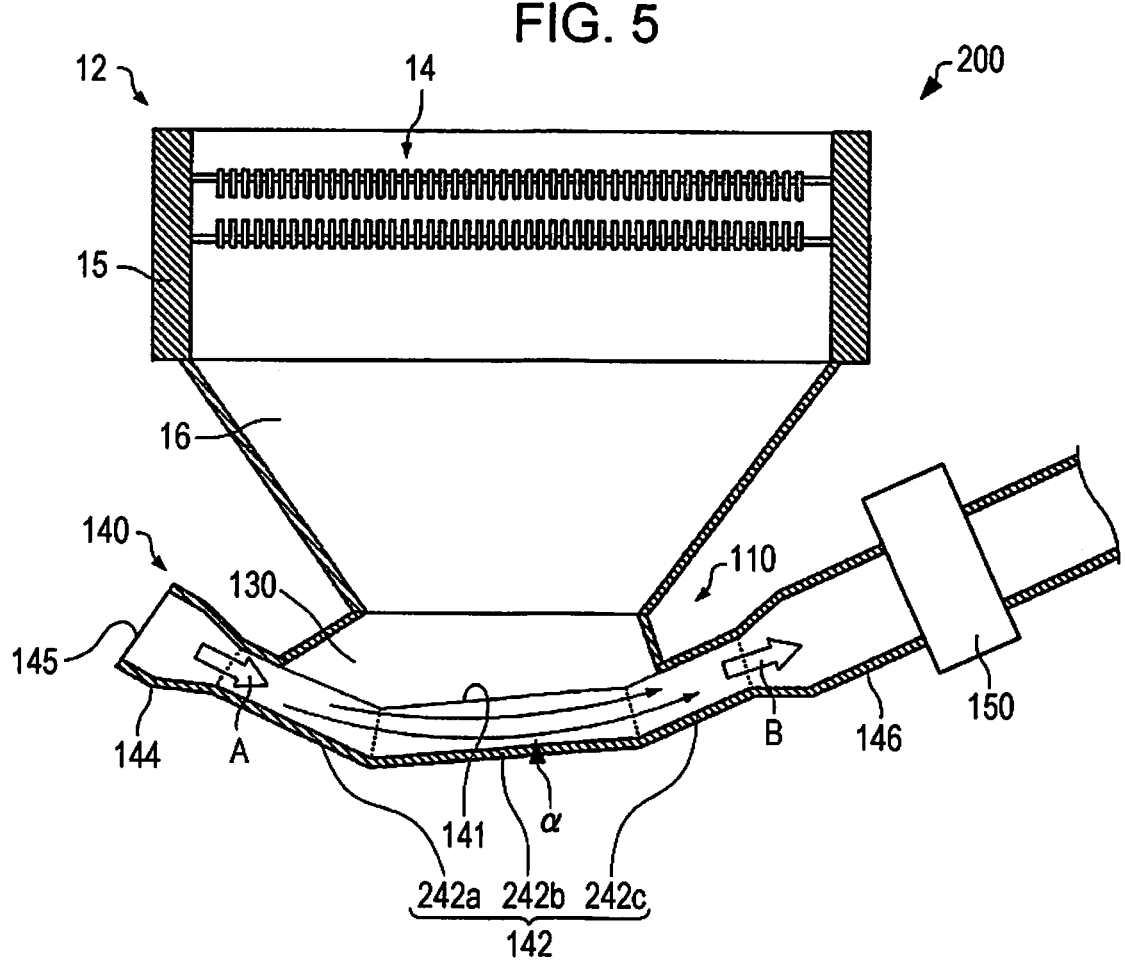
FIG. 5 is a cross-sectional view schematically illustrating a transport device of a sheet manufacturing apparatus according to a first modified example of the embodiment.

3. Modified Example of Sheet Manufacturing Apparatus 3.1. First Modified Example Next, a sheet manufacturing apparatus according to a first modified example of the embodiment will be described with reference to the drawings. FIG. 5 is a cross-sectional view schematically illustrating a sheet manufacturing apparatus 200 according to the first modified example of the embodiment.

Hereinafter, in the sheet manufacturing apparatus 200 according to the first modified example of the embodiment, the members having the same functions as the components of the sheet manufacturing apparatus 100 according to the embodiment described above are denoted by the same reference numerals, and a detailed description thereof will be omitted. This also applies to a sheet manufacturing apparatus according to a second modification of the embodiment described below.

In the sheet manufacturing apparatus 100 described above, as illustrated in FIG. 2, the first portion 142 of the transport pipe 140 of the transport device 110 has the curved shape. On the other hand, in the sheet manufacturing apparatus 200, as illustrated in FIG. 5, the first portion 142 of the transport pipe 140 of the transport device 110 does not have the curved shape, and the first portion 142 has a folding shape. In the illustrated example, the first portion 142 has three rectilinear portions 242a, 242b, and 242c.

The first rectilinear portion 242a is connected to the second portion 144. The second rectilinear portion 242b is connected to the first rectilinear portion 242a. The third rectilinear portion 242c is connected to the second rectilinear portion 242b and the third portion 146.

In the transport device 110 of the sheet manufacturing apparatus 200, the rectilinear portions 242a, 242b, and 242c are connected to adjacent rectilinear portions so as to draw a circular arc (in a U shape). The introduction port 141 is provided inside rectilinear portions 242a, 242b, and 242c connected so as to draw the circular arc. As a result, in the transport devices 110, the air flow α can have a velocity difference in a direction orthogonal to the direction of the air flow α in the transport pipe 140, and the introduction port 141 can be provided on the side where the velocity of the air flow α is lower. As a result, in the transport device 110, it is possible to suppress the retention of the material to be transported while suppressing the flow rate of the air flow. The number of the rectilinear portions constituting the first portion 142 is not particularly limited as long as the number is plural.

3.2. Second Modified Example

Figure 6:
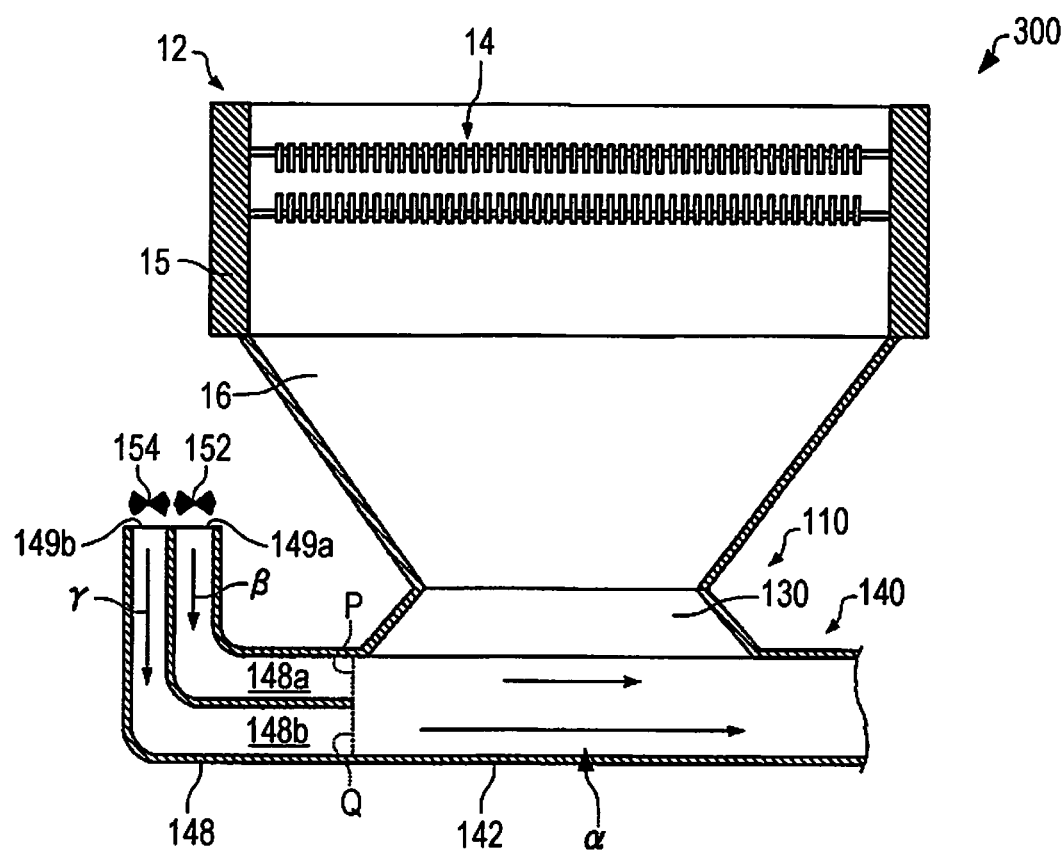
FIG. 6 is a cross-sectional view schematically illustrating a transport device of a sheet manufacturing apparatus according to a second modified example of the embodiment.

Next, a sheet manufacturing apparatus according to a second modified example of the embodiment will be described with reference to the drawings. FIG. 6 is a cross-sectional view schematically illustrating a sheet manufacturing apparatus 300 according to a second modified example of the embodiment.

In the sheet manufacturing apparatus 100 described above, as illustrated in FIG. 2, the first portion 142 of the transport pipe 140 of the transport device 110 has the curved shape. On the other hand, in the sheet manufacturing apparatus 300, as illustrated in FIG. 6, the first portion 142 of the transport pipe 140 of the transport device 110 does not have the curved shape, and the first portion 142 has a linear shape.

In the sheet manufacturing apparatus 300, the transport pipe 140 has a fourth portion 148 on the upstream side of the air flow α from the first portion 142. The fourth portion 148 is connected to the first portion 142. In the illustrated example, the fourth portion 148 has a bent shape, and may have the linear shape.

The fourth portion 148 forms forked flow passages (two flow passages) 148a and 148b. The first flow passage 148a communicates at a boundary P with the inside of the first portion 142. The second flow passage 148b communicates at a boundary Q with the inside of the first portion 142. The boundary P and the boundary Q exist on the same virtual plane in a direction orthogonal to the direction of the air flow α, and the distance between the boundary P and the introduction port 141 is smaller than the distance between the boundary Q and the introduction port 141.

The first flow passage 148a has a first opening 149a for introducing an air flow β. In the vicinity of the first opening 149a, a first air flow generation portion 152 is provided. The second flow passage 148b has a second opening 149b for introducing an air flow γ. In the vicinity of the second opening 149b, a second air flow generation portion 154 is provided. For example, an ejector for sending air is used as the air flow generation portions 152 and 154.

In the transport device 110 of the sheet manufacturing apparatus 300, the velocity of the air flow β passing through the first flow passage 148a by the first air flow generation portion 152 is smaller than the velocity of the air flow γ passing through the second flow passage 148b by the second air flow generation portion 154. The air flow β and the air flow γ are mixed in the first portion 142 and become the air flow α. Therefore, the air flow α has a velocity difference in the direction orthogonal to the direction of the air flow α in the vicinity of the boundary P and Q. The introduction port 141 is provided in a range where the air flow α has a velocity difference in a direction orthogonal to the direction of the air flow α. Therefore, in the transport device 110 of the sheet manufacturing apparatus 300, the introduction port 141 can be provided on the side where the velocity of the air flow α is lower. As a result, in the transport device 110, it is possible to suppress the retention of the material to be transported while suppressing the flow rate of the air flow.

The sheet S manufactured by the sheet manufacturing apparatus according to the present invention mainly refers to a sheet formed into a sheet shape. However, the sheet S is not limited to a sheet shape, and may be in the form of a board or a web. The sheet in the specification is divided into a paper and nonwoven fabrics. The paper includes an aspect in which from pulp or waste paper as a raw material is formed into a thin sheet, and includes a recording paper for writing or printing, a wallpaper, a wrapping paper, a colored paper, a drawing paper, Kent paper, and the like. The nonwoven fabrics are thicker nonwoven fabrics than paper or low-strength nonwoven fabrics, and include general nonwoven fabrics, a fiber board, a tissue paper (tissue paper for cleaning), a kitchen paper, a cleaner, a filter, a liquid (waste ink and oil) absorbent material, a sound absorbing material, a heat insulating material, a cushioning material, a mat, and the like. As raw materials, vegetable fibers such as cellulose, chemical fibers such as polyethylene terephthalate (PET), polyester, animal fibers such as wool and silk may be used.

The present invention may omit a portion of the configuration within a range having the features and effects described in this application, or combine each embodiment and modified example. The manufacturing portion 102 may omit a portion of the configuration, add another configuration, or replace the known configuration within a range where the sheet can be manufactured.

The present invention includes substantially the same configuration as the configuration described in the embodiment (for example, configuration having the same function, method, and result, or configuration having the same object and effect). In addition, the present invention includes a configuration in which non-essential parts of the configuration described in the embodiment are replaced. In addition, the present invention includes a configuration that achieves the same operation and effect as the configuration described in the embodiment, or a configuration that can achieve the same object. In addition, the present invention includes a configuration in which a known technique is added to the configuration described in the embodiment.

REFERENCE SIGNS LIST 3, 7, 8 pipe
9 hopper
10 supply portion
12 coarse crushing portion
14 coarse crushing blade
15 support portion
16 shooter
20 defibrating portion
22 introduction port
24 discharge port
40 sorting portion
41 drum portion
42 introduction port
43 housing portion
44 discharge port
45 first web forming portion mesh belt
47, 47a stretching roller
48 suction portion
49 rotating object
49a base portion
49b projection portion
50 mixing portion
52 additive supply portion
54 pipe
56 blower
60 accumulation portion
61 drum portion
62 introduction port
63 housing portion
70 second web forming portion
72 mesh belt
74 stretching roller
76 suction mechanism
78 humidity conditioning portion
80 sheet forming portion
82 pressing portion
74 heating portion
85 pair of calender rollers
85a metallic roller
85b elastic roller
86 pair of heating rollers
90 cutting portion
92 first cutting portion
94 second cutting portion
96 discharge portion
100 sheet manufacturing apparatus
102 manufacturing portion
104 control portion
110 transport device
130 guide portion
132 first inclined surface
134 second inclined surface
140 transport pipe
141 introduction port
142 first portion
142a first side wall portion
142b second side wall portion
143 inner surface
144 second portion
144a connection portion
145 opening
146 third portion
146a connection portion
148 fourth portion
148a first flow passage
148b second flow passage
149a first opening
149b second opening
150 air flow generation portion
152 first air flow generation portion
154 second air flow generation portion
200 sheet manufacturing apparatus
242a first rectilinear portion
242b second rectilinear portion
242c third rectilinear portion
300 sheet manufacturing apparatus
1016 shooter
1110 transport device
1130 guide portion
1140 transport pipe
1141 introduction port
1142 first portion A inflow direction
B outflow direction
P, Q boundary
R direction
S sheet
T contact point
V, W web
α, β, γ air flow

The invention claimed is:

1. A transport device comprising:
 a transport pipe that transports a material to be transported including at least one of a sheet piece, a fiber, and a powder; and
 a blower that generates an air flow in the transport pipe, the transport device transporting the material to be transported by the air flow,
 wherein the transport pipe includes
  an introduction port into which the material to be transported is introduced, and
  a first portion with a curved or folded shape, the first portion has a lowest part that is positioned lowest in the transport pipe,
 the blower is positioned downstream relative to the first portion in a direction of the air flow,
 the transport pipe is connected to the blower at a connection point that is entirely higher than the lowest part of the first portion,
 the air flow has a velocity difference in a direction orthogonal to a direction of the air flow in the transport pipe, and
 the introduction port is provided on a side where a velocity of the air flow is lower.

2. The transport device according to claim 1, further comprising:
 a guide that guides the material to be transported toward the introduction port.

3. The transport device according to claim 2,
 wherein in the guide, a surface on a downstream side of the air flow is inclined toward the introduction port in the direction of the air flow in the guide.

4. The transport device according to claim 1,
 wherein the introduction port is disposed at the first portion, and
 the transport pipe further includes a second portion on an upstream side of the air flow from the first portion, and
 a cross-sectional area defined by the first portion is smaller than a cross-sectional area defined by the second portion.

5. The transport device according to claim 1,
 wherein the transport pipe further includes a third portion downstream relative to the first portion in the direction of the air flow, the third portion has an upstream end in the direction of the air flow,
 the blower is connected to the third portion at a downstream side of the upstream end in the direction of the air flow, and
 an imaginary center line extending along a center of the third portion from the upstream end to the blower is inclined upward as approaching the blower.

6. A transport device comprising:
 a transport pipe that transports a material to be transported including at least one of a sheet piece, a fiber, and a powder; and
 a blower that generates an air flow in the transport pipe, the transport device transporting the material to be transported by the air flow, wherein the transport pipe includes a first portion provided with an introduction port into which the material to be transported is introduced, the first portion has a curved or folded shape and includes a lowest part that is positioned lowest in the transport pipe, the blower is positioned downstream relative to the first portion in a direction of the air flow, the transport pipe is connected to the blower at a connection point that is entirely higher than the lowest part of the first portion, an inflow direction of the air flow into the first portion is different from an outflow direction of the air flow flowing out from the first portion, and the introduction port is provided on the outflow direction side of the transport pipe when viewed in the inflow direction.

7. A transport device comprising:

a transport pipe for transporting a material to be transported including at least one of a sheet piece, a fiber, and a powder; and a blower for generating an air flow in the transport pipe, the transport device transporting the material to be transported by the air flow, wherein the transport pipe includes a curved portion includes a lowest part that is positioned lowest in the transport pipe, and an introduction port provided inside the curved portion and into which the material to be transported is introduced,.

the blower is positioned downstream relative to the curved portion in a direction of the air flow, and the transport pipe is connected to the blower at a connection point that is entirely higher than the lowest part of the curved portion.

8. The transport device according to claim 7, wherein a radius of curvature of the curved portion is in a range of 5 times to 15 times of an inner width of the curved portion.

9. A sheet manufacturing apparatus comprising: the transport device according to claim 1.

* * * * *